(12) United States Patent
Lam

(10) Patent No.: US 7,194,327 B2
(45) Date of Patent: Mar. 20, 2007

(54) BODY PROFILE CODING METHOD AND APPARATUS USEFUL FOR ASSISTING USERS TO SELECT WEARING APPAREL

(76) Inventor: Peter Ar-Fu Lam, 20104 Wayne Ave., Torrance, CA (US) 90503

( * ) Notice: Subject to any disclaimer, the term of this patent is extended or adjusted under 35 U.S.C. 154(b) by 562 days.

(21) Appl. No.: 10/193,838

(22) Filed: Jul. 12, 2002

(65) Prior Publication Data

US 2002/0178061 A1    Nov. 28, 2002

(51) Int. Cl.
*G06F 17/60* (2006.01)
*G06F 19/00* (2006.01)

(52) U.S. Cl. .................. 700/132; 700/134; 705/26; 341/87

(58) Field of Classification Search ................ 700/132, 700/134, 131, 130, 136; 341/87; 356/394; 382/111; 33/512; 705/1, 26
See application file for complete search history.

(56) References Cited

U.S. PATENT DOCUMENTS

| | | | | | |
|---|---|---|---|---|---|
| 4,417,401 | A | * | 11/1983 | Aisaka et al. | 33/512 |
| 4,881,075 | A | * | 11/1989 | Weng | 341/87 |
| 5,515,268 | A | * | 5/1996 | Yoda | 705/26 |
| 6,101,424 | A | * | 8/2000 | Sawada | 700/136 |

* cited by examiner

*Primary Examiner*—Peter Nerbun

(57) ABSTRACT

A computer supported system especially configured for users to easily coordinate or harmonize apparel before making a purchasing decision. The embodiments include a body profile generating, encoding and decoding system. The system defines a display region configured for displaying the personalized real human facial image of a user combining the visual image of a selected garment. The shape and size of the garment is faithfully adjusted in accordance to the body profile coding parameters of the garment. The database representing the facial images of users is shared by different stores.

44 Claims, 13 Drawing Sheets

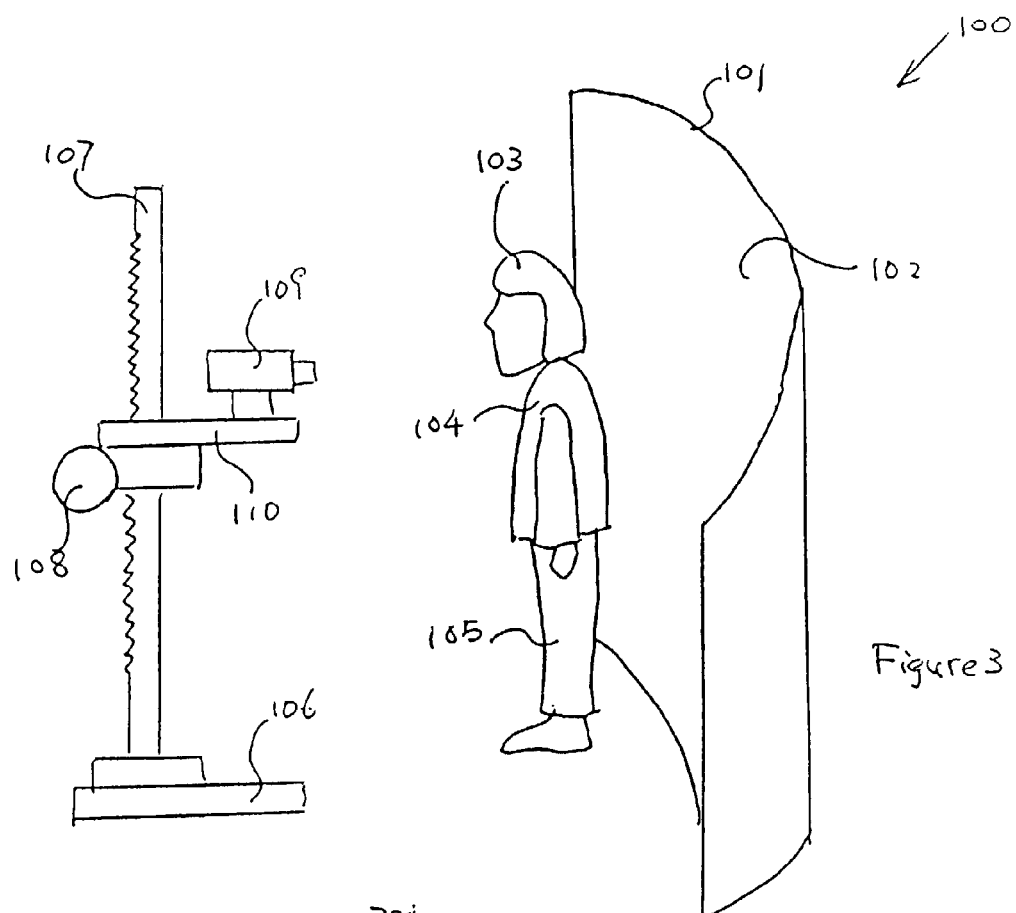
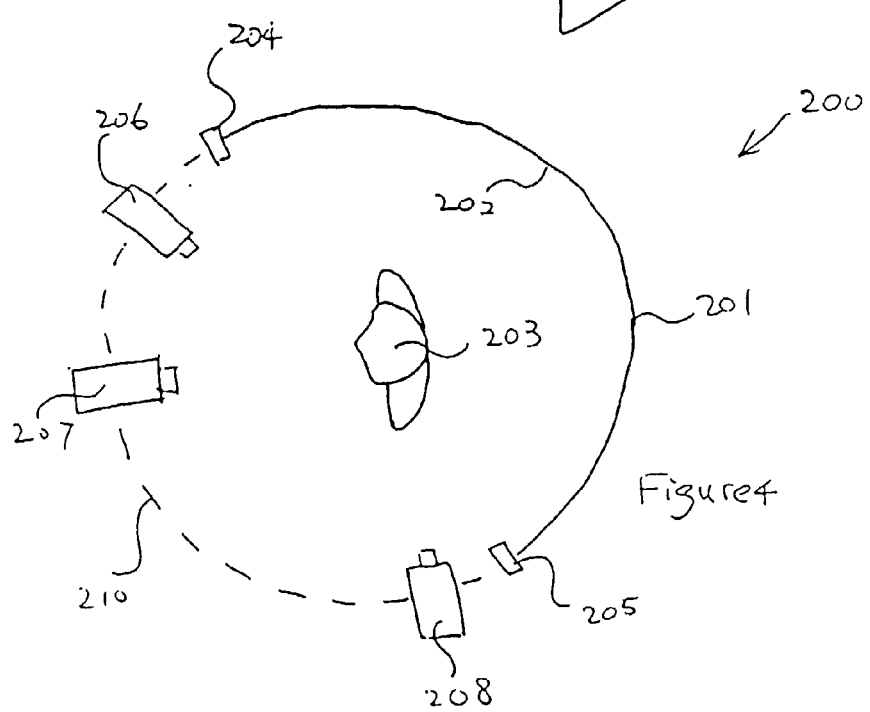

US 7,194,327 B2

BODY PROFILE CODING METHOD AND APPARATUS USEFUL FOR ASSISTING USERS TO SELECT WEARING APPAREL

FIELD OF THE INVENTION

This invention relates generally to methods and apparatus for use by retailers for facilitating a customer's selection of coordinated and properly sized articles of wearing apparel.

BACKGROUND OF THE INVENTION

This is the national stage application of PCT/US01/01923 filed on Jan. 19, 2001. Various systems have been discussed in the prior art for assisting a user to select coordinated and properly sized articles of wearing apparel; e.g. U.S. Pat. Nos. 4,149,246; 4,539,585; 5,163,007; 5,515,248; 5,680,528; 5,724,522; 5,850,222; 5,930,769; 5,937,081; 5,970,471 and 5,974,400.

Applicant's priority applications describe the use of a monitor for electronically displaying a facial image in combination with a garment supporting structure which can be used as follows:
(1) Provide a facial image capture set up at a point of sale.
(2) Facial images of customers are collected with this setup.
(3) The facial image is digitized into electronics data and stored as a file.
(4) A code word or file name is assigned to each file to identify the facial image of one customer from another.
(5) The file is decoded and displayed on the computer monitor mounted on top of the garment displaying stand.
(6) Input device such as key pad, joystick, mouse or other point device and even voice recognition device are used to identify which facial image is to be displayed and also to provide adjustment, options selection and modification of the facial image or the relative position of the image to be displayed.

With greater investment in storage memory and image playback facilities, multiple facial images from different viewing angles can be collected. In this situation, the display stand can be rotated for viewing the garment in different orientations, when the orientation of the facial image is changed. If multiple facial images are collected at a high frame rate such as 25 frames per second while the viewing angle is continuously changing, the playback of the facial image at the monitor will provide a movie like movement result. To fully match with the movie play back effect, such as when the user's head is turning left or right, the garment is moved in the same direction and in synchronization with the head turning motion displayed. The overall result becomes an animated presentation of the garment coordination matching with the user.

Once a customer registers his/her facial image at an image capturing facility, the image file, identified by a code word, can be sent to a remote computer by a communication channel. A communication link (or communication channel) refer to any means connecting two computing devices together, including internet, intranet, extranet, ISDN, DSL, LAN and any future connection systems. The communication channel can be provided by wired lines such as cable, optical lines or telephone lines. It can be connected to the computer by any commercially available format of communication such as COM port, parallel port, Firewire and USB port. In addition to connected wires, the communication channel can be furnished by wireless channel such as RF and infra red channels as well. An example of RF link is represented by the recently established Bluetooth standard.

A fashion store may also set up a library of images representing its garment collection at the remote computer. Garment images can be created by the same process to capture the electronics image file of a facial image; partially or completely created by image drafting software commercially available. With this service, customers may access the web site of the fashion store from the internet or the world wide web to fetch the file representing their facial images and/or the images of the garment to be selected. With the support of proper software, the facial image of the customer and the garment can be combined and displayed on the computer monitor located at the home of the potential customer. Personalized animated fashion show is also possible if multiple facial images and the garment are provided. This service gives customers greater confidence before they placed mail orders and avoids returns. Alternatively, customers may preview their preferred garment, and coordinated with their facial images. After customers record their preference, they may place a mail order. Alternatively customers may go to a store to actually try their short listed preferences and then confirm their purchase.

SUMMARY OF THE INVENTION

The present invention is directed to an enhanced system for facilitating traditional and/or internet retail sales of garments, i.e., wearing apparel. A business method in accordance with the invention for use by clothing retailers includes:
  acquiring a customer body profile (BP) code defining multiple values respectively describing different physical dimensions of a customer's body;
  providing a plurality of garment body profile (BP) codes each representing a different garment, each garment BP code defining multiple values respectively describing different physical dimensions of a garment;
  processing said customer BP code and a selected garment BP code to identify dimensional differences between said customer's body and the garment represented by said selected garment BP code; and
  producing human understandable output indicating the dimensional differences between said customer's body and said garment related to said selected garment BP code.

More particularly, the present invention is directed to a full service system to automate capturing data about the body profile (BP) parameters of a user (or customer), and assigning a personalized ID number to this data file. Other personalized data that can be applied into the system is a pass word enabling a computing apparatus to fetch a personalized data file upon request. Another important part of the system is to provide garment images, in the way that the shape and size of the garment image will be adjusted to match the body profile of the user; bigger garment for bigger people and thinner garment for skinny people. Together with a facial image of the user, appropriately combined with the garment image, a virtual garment coordination system is provided allowing the user to efficiently appraise the real life coordination with different garments without actually putting on the garments one by one. When the user profile data base and garment data base are configured to provide animated images, a personalized fashion show is then possible. Besides, the computer supported garment coordination system enables the coordination images of two different garments to be placed side by side on a same display screen for instant comparison purpose.

Once a user identifies a preferred garment, the data file describing the body profile of the user can be used to match with the sizes of available garment inventory. If a stocked item fitting the body profile of the user is available, the sale can be concluded. If a matching item is not available, the user will be notified and a rain check can be generated. Alternatively, a work order can be generated for the factory to manufacture the selected garment perfectly fitting the size of the user. On the manufacturing side, the BP coding system described hereinafter can be linked up with a CAM (computer aided manufacturing) facility. Further automation is possible by making use of the BP code to automatically plan and/or cut the fabric according to the design pattern of the garment selected.

In accordance with a preferred embodiment, a camera is set up in front of a user to capture images of the user. The images of the user including the facial image and the body image are converted into digital data. A computer assisted apparatus such as a DSP (digital signal processor) is then provided to analyze the body images of the user and generate several dimensional parameters characterizing the dimensional requirements of a garment to fit the body size of the user. Such parameters may include, but are not limited to shoulder width, arm length, neck circumference, upper torso height, waist dimension, inseam dimension, hips size and waist to ground level.

In order for the video data describing the body parameters of a person to be distinguishable from the background of a picture captured by the camera, a non-interfering background is provided. In accordance with a traditional chroma keying effect being used in TV recording studios, the background picture is a blue wall or a picture mainly decorated with blue tones. Another technology capable of separating a human body from a background well know to the art is to take picture of a moving person while the background is stationary. The frozen snap shot of a moving body is then distinguishable from the stationary background. There are various other computer supported topological technologies well known to the art are capable to provide the desirable function of the invention.

Many DSP algorithms are capable of recognizing the human body profile. If a lower cost and less powerful visual measurement system is desired, a specially designed "measurement outfit" or "reference clothing" is recommended to provide higher accuracy result. The reference clothing is preferably to be of homogeneous color distinguishable from the background. It is preferably made of elastic material such as spandex for two reasons: (1) for the reference clothing to fit people of different weights; and (2) for the body curvature of the user body to be fully visible by the imaging system. A reference mark of design and color significantly distinguishable to computer vision is also recommended to help locating the critical reference points of the human body, such as the neck, the shoulder, the wrist, the waist and the ankle. An alternative to the reference clothing approach is to provide specially designed reference strips. Each reference strip consists of a homogenous distinguishable color background and preferably marked with special reference marks. The ends of each reference strip is sewn with velcro in order for the strip to be attached to the appropriate location of the human body. The advantage of the reference strip is that the user is not required to put on the reference clothing before the picture is taken.

In order to provide a more accurate measurement of some specific body dimensional parameters such as waist and body height, the camera is preferably configured to travel up and down. The camera may also be motorized or positioned at different angles from the user, so as to take a picture of the user with different angles of view. Multiple visual pictures are then captured from the camera. The image data collected are processed to provide the parametric data describing the body profile of the user. It should be noted that multiple stationary cameras can be arranged to replace the moving camera and provide the similar data collection function.

When multiple facial images of the user and appropriate animated images of a garment are combined, the resulted animated images provide a personalized fashion coordination show. There are different data format and technologies available to provide the animation effect desired. Multiple garment images may be generated with the similar set up described above, by 3D rendering technique or by computer assisted animation algorithms.

Once the user's body profile is established, the user is assigned an ID, which is for the servicing system to retrieve the specific body profile data file whenever this ID is presented. The ID may be in the form of numbers, alphanumeric words or and other form readable by a computer. The ID may come along with a security password, which prevents unauthorized use of the profile information. The body profile data file is typically stored in the memory area of a computer system. This memory area is typically represented by magnetic media, optical media or solid state media such as RAM, SRAM and flash memory. In field applications, the personalized ID is preferably to be stored onto a card or a tag. In this way every time the user visits a fashion store, he/she simply swipes the card with a reading machine without having to memorize the ID number. Alternatively, some key body profile parameters may be stored at the card as well, so that the machine reading the card is not required to connect to the central body profile memory storage system every time the data are to be retrieved. Other than the dimensional parameters describing the body profile of the user, the facial image data of the user is preferably held as a separate file linked with the same ID or stored together with the body profile in a similar data file.

Because the file size of the body profile parameters may be too big to be stored onto a card, a high compression BP coding method is disclosed herein so that users can remember or present his/her body measurements easily. If the facial image of the user is not included, the ID generated may be compressed or encoded such that one simple code number represents two or more measurement parameters. A simple BP code is extremely useful to enhance transportability, data storage and management of body measurements; and to improve the efficiency of garment manufacturing, inventory control and retail customer service. In a preferred Body Profile encoding system, a five to eight digit system should be able to represent all the measurements of a human body. Accordingly, every user having the same profile parameters will be allocated the same BP (Body Profile) code. For example, assuming a body profile system is defined to measure seven variables: neck circumference, shoulder width, arm length, chest circumference; waist circumference; hips size and inseam; and each parameter is quantized into nine different incremental measurements to service different body size users, the total possible combinations of these variables is $9^7$ (i.e. 4,782,969), which can be represented by a five digit alphanumeric number. The alphanumeric set can consist of 34 characters, i.e., numbers 0 to 9, and symbols A to Z, excluding letter O and letter I which are easy to be confused with the numbers 0 and 1. A four digit alphanumeric number will represent 1,336,336 combinations. A five digit number will give 45,435,424 combinations and a six digit code will provide 1,544,804,416 combinations. For example, a BP code "6RX3T" may represent the parameters of neck=3; shoulder width=4; arm length=4;

chest=3; waist=3; hips=3 and inseam=5. The simplified number scale of each parameter is further referred to a look up table to obtain a specific measurement reading. For example, a number 4 neck circumference size is referred to 13 inches to 13.5 inches from the table and a waist number of 4 is referred to 24 inches to 25 inches. Alternatively, the coding system may be subdivided into "child size", "ladies", "gentlemen" and "big and tall". In this way the number scale in each class may refer to a different dimensional table depending on the class used. It is believed that for child size, most numbers will be of small values; for big and tall people most numbers will be at the high end. As a result, a four to five digits BP (body profile) coding system may be adequate to service the system because many special combinations such as an extremely narrow waist and very big hips will be unreasonable. The number of possible parameters combined will be substantially less than the mathematical combinations of all variables by eliminating all the unreasonable combination of parameters. All the reasonable combinations left over is then encoded or decoded by a computer program according to a carefully designed algorithm to minimize coding and decoding computing time. This system is highly preferable because the body profile parameters can be organized by a standard computer program which can be encoded or decoded at any personal computer. Since everyone is sharing a standardized encoding and decoding system, the central body profile storage computer is thus eliminated.

The novel features of the invention are set forth with particularity in the appended claims. The invention will best be understood from the following description, when read in conjunction with the accompanying drawings.

DESCRIPTION OF THE DRAWINGS

FIG. 3 is an image capture setup configured to generate parametric data describing a body profile;

FIG. 4 is another image capture setup with the camera facing the user at different orientations;

DETAILED DESCRIPTION

Figures 1, 2:
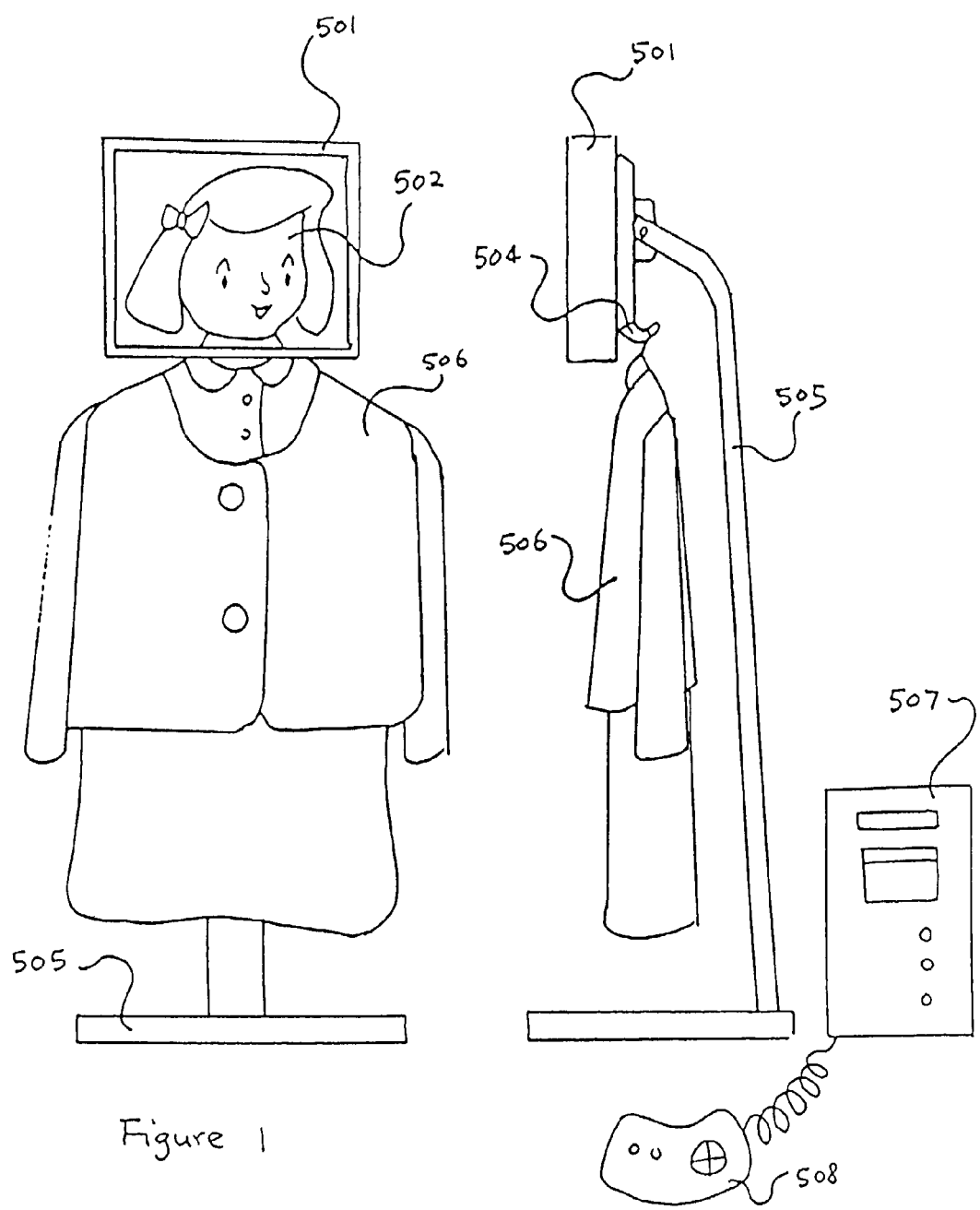
FIG. 1 is a front view of a floor stand having an electronics display device.
FIG. 2 is a side view of FIG. 1 together with a computer and controller.

Attention is initially directed to a system having a library of facial images of users, which are useful to enable a user to experience life like virtual garment coordination with a selected garment. The user image can be obtained by scanning the photograph of a user or by capturing a digital facial image of the user by a digital camera. Attention is now directed to an exemplary set up disclosed in applicant's priority application. FIG. 1 depicts an embodiment having an image displaying region represented by an electronics display device such as a computer monitor. The electronics display device 501 is supported by the floor stand 505. The facial image 502 of a user is displayed on the screen. A garment 506 is positioned beneath the facial image displayed. An LCD monitor is preferred due to its thin profile and light weight. FIG. 2 is the side view of the set up shown in FIG. 10. A receiver 504 located behind the display region receives the hook member of the hanger supporting the garment 506. The computing device 507 converts the digital facial imager of a person and displays it on the electronics display device 501. The computing device 507 may receive the image data from a remote computer storing a library of facial images. A controller or input device 508 enables users to key in their own code word and fetch their own personalized facial images to be displayed onto the display screen. The input device can also be used to modify the presentation of the facial image such as modifying the color balance and adjusting the relative position of the image.

FIG. 3 demonstrates a set up for a camera to capture the facial and body images of the user. The user having a facial portion 103, an upper torso 104 and a lower torso 105 stands in front of a background wall 101. In front of the user is a digital camera 109 which rests on a supporting mechanism 110. The supporting mechanism is mounted on a pole 107 and is configured to travel up or down along the pole by the driving force supplied by a motor 108. The pole 107 is supported by a platform or podium 106. The camera 109 captures a facial image 103 of the user having a non-interfering background 102. The digital data representing the facial image of the user is then sent to an image processing computing device (not shown) configured to eliminate the background picture and extract the facial image. When the camera 109 is adjusted by the motor 108 to a lower level, a picture of the upper and lower torso of the user can be captured. A calibrated input vernier measuring the height of the camera from the floor can be used to provide data describing various body profile parameters of the user, such as the body height and leg length. Multiple cameras positioned at different locations may be set up to replace a movable camera to improve the facility reliability. The face or head size of the user can be obtained by measuring electronically or manually the facial image of the user. Since various parameters are to be measured according to the pictures captured, the background of the picture should be controlled, in order for the computer supported image extraction mechanism to work properly. The non-interfering background refers to any background which does not interfere with the activity of the camera and computer to measure the body dimension of the object human body. The requirement of a non-interfering background varies according to the hardware and software algorithm of the image processing computer. A typical example of a non-interfering background is a blue color wall commonly used for the traditional chroma keying effect in TV recording studios. In this system, any relative pure non-blue image signal received will be discarded. Eventually an outline of the body can be defined. Alternatively, it may be a pure white background distinguishable by the camera and the specific measurement method utilized by the system to achieve the measurement goal. If multiple pictures and relative movement between the person and the camera are provided, the measurement can be achieved by interpolation of the body profile data collected at different viewing angles. Due to continuously increasing improvement of DSP and software interpolation technology, it is expected that in the future, the non-interfering background can be any stored background without having a specific color or lighting requirement. In order to obtain a consistent data extraction effect, the light illuminating the user and the non-interfering background are preferably also controlled.

FIG. 4 illustrates an enhanced arrangement of FIG. 3 in which the podium 106 is motorized to travel around the user 203 along the path 210. With this arrangement, multiple views of the user from different angles 206, 207 and 208 are captured to generate facial images from different angles of view. Multiple angle snap shots are also required to enable the computer supported system to more accurately measure or calculate many important parameters of the user body profile, such as the chest size, the waist size and the hips size. Another way to obtain multiple angle snap shots is to arrange multiple cameras 206, 207 and 208. Alternatively a controlled turn table may be placed beneath the user so that the position of the user is rotated instead of the position of the camera to obtain the same effects. If continuous pictures are captured, the playback facial image can be used to combine with animated garment images to provide a movie like fashion show effect.

When the body outlines obtained from different angles of view, distinguishable from the non-interfering background are processed by the supporting computer, a family of parameters describing the body profile of the user can be indirectly calculated. Various imaging processing or interpolation techniques and DSP algorithms are available to calculate indirectly the values of these parameters. Image processing means in this application is defined by any computer supported apparatus, equipped by specific hardware or software, or both, able to process the image data in order to obtain the result or data desired, in accordance with the image processing criteria predefined. In many situations, an image processor may require manual assistance to obtain the most accurate result. For example, in order to simplify the calculation process and reduce the cost of the processing system, an image processing result can be obtained by requiring the user to put on a specially designed reference clothing 300 illustrated in FIG. 5. The reference clothing 300 is preferably made of a homogenous elastic material to accurately reflect the body curvature of the user. Highly distinguishable reference marks 302, 303, 304, 307 308 and 309 are preferably added to highlight the critical reference points of the user body. Many parameters can then be calculated by measuring the distance between these reference marks. For example, the arm length can be obtained by measuring the distance between the reference marks 303 and 304. The waist size can be calculated by measuring the extended width of the reference mark 307. The inseam can be read by measuring the distance between the reference marks 308 and 309. In order to obtain higher measurement accuracy, special marking shapes can be added onto the reference marks to facilitate the computer automated measurement job. For example, cross shape marks 305 and 306 are added onto the reference mark 307 for measuring the inseam. When three dimensional parameters are measured, more than one pictures of the user wearing the reference clothing is recommended to be taken from different viewing angles. The data obtained from these pictures are to be processed altogether to obtain the body profile parameters indirectly.

Figure 5:
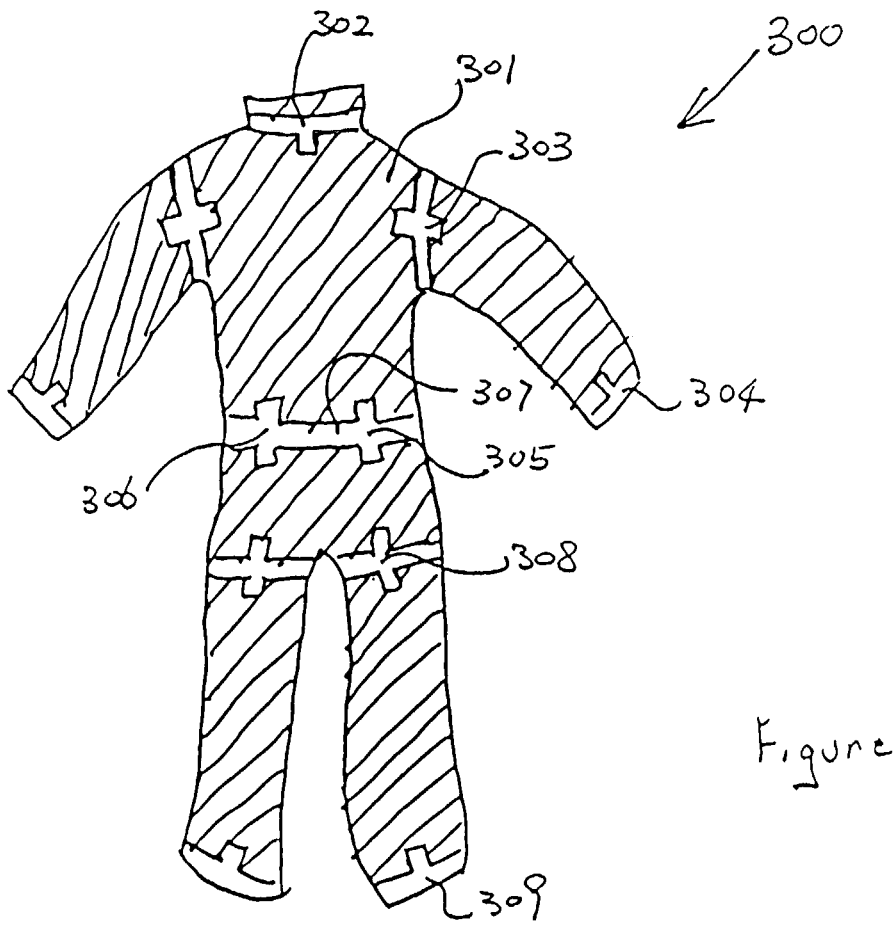
FIG. 5 demonstrates the design of a reference clothing.
Figure 6:
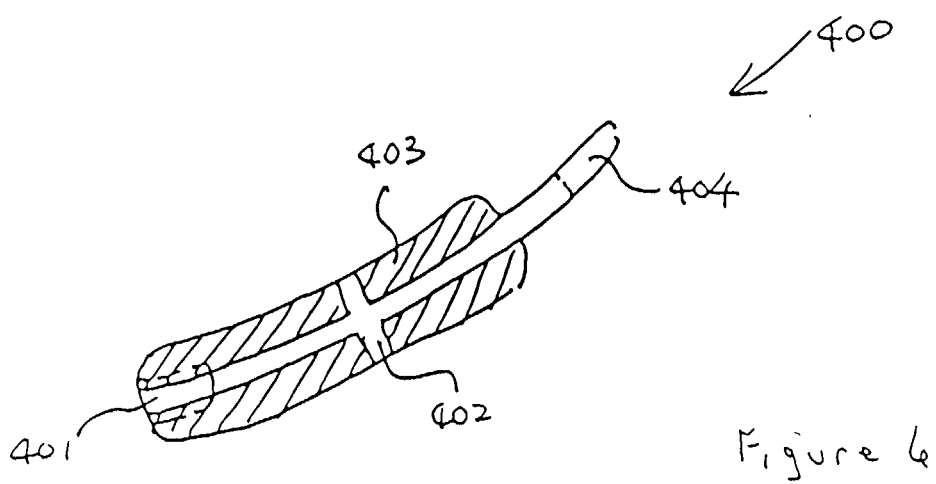
FIG. 6 demonstrates the design of a reference strip.

FIG. 6 illustrates the design of reference strips, which can be put onto the regular clothing of users to obtain the similar effect of the reference clothing of FIG. 5. The reference strip 400 comprises a dark background 403 and a highlighted area 402. Velcro strips are added to the ends of the reference strips to enable the reference strips to be attached to the appropriate location of the user body, such as the waist and the arm. The detachable reference strips are preferred over the reference clothing because the user is not required to put on the appropriately sized reference clothing before the picture can be captured.

It should be noted that the style and shape of the reference clothing and reference strips are exemplary. Different shape, style and design capable of serving a similar function are included in the scope of this invention. Other than a fully automated system, manual assisted measurement is recommended to correct some particular measured parameters which tend to have a higher error rate. Alternatively, users can measure their own body profile parameters, record the measurements on a check list; and then enter the data into a terminal to establish their body profile file in the system and to obtain the ID code.

Figure 11:
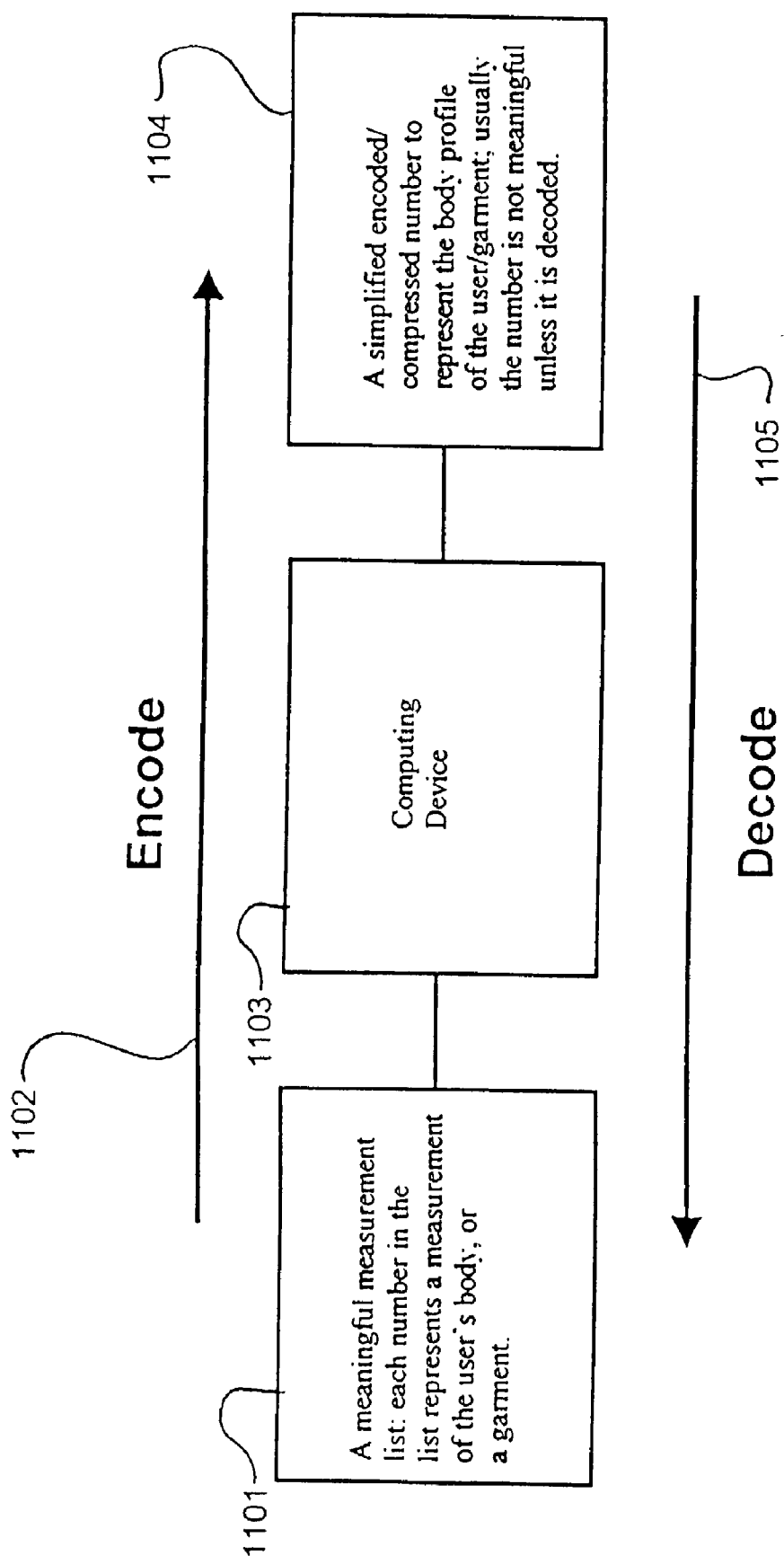
FIG. 11 illustrates the relationship between a body measurement list and an encoded/compressed number to represent said body measurement list.

Attention is now drawn to FIG. 11 which illustrates the basic system to convert all the actual physical measurements of a user body and encode them into a single body profile (BP) code. The BP code is highly compressed for easier portability and handling by users and the retail stores during shopping. During the encoding process 1102, the physical measurements of a user, or a garment, are processed by a computer 1103 according to a suitable encoding algorithm. The output is a simple code represented by the block 1104. The highly compressed BP code usually does not have any physical meaning by it self unless it is used to reproduce a detail body measurement list through the decoding process 1105.

Figure 12:
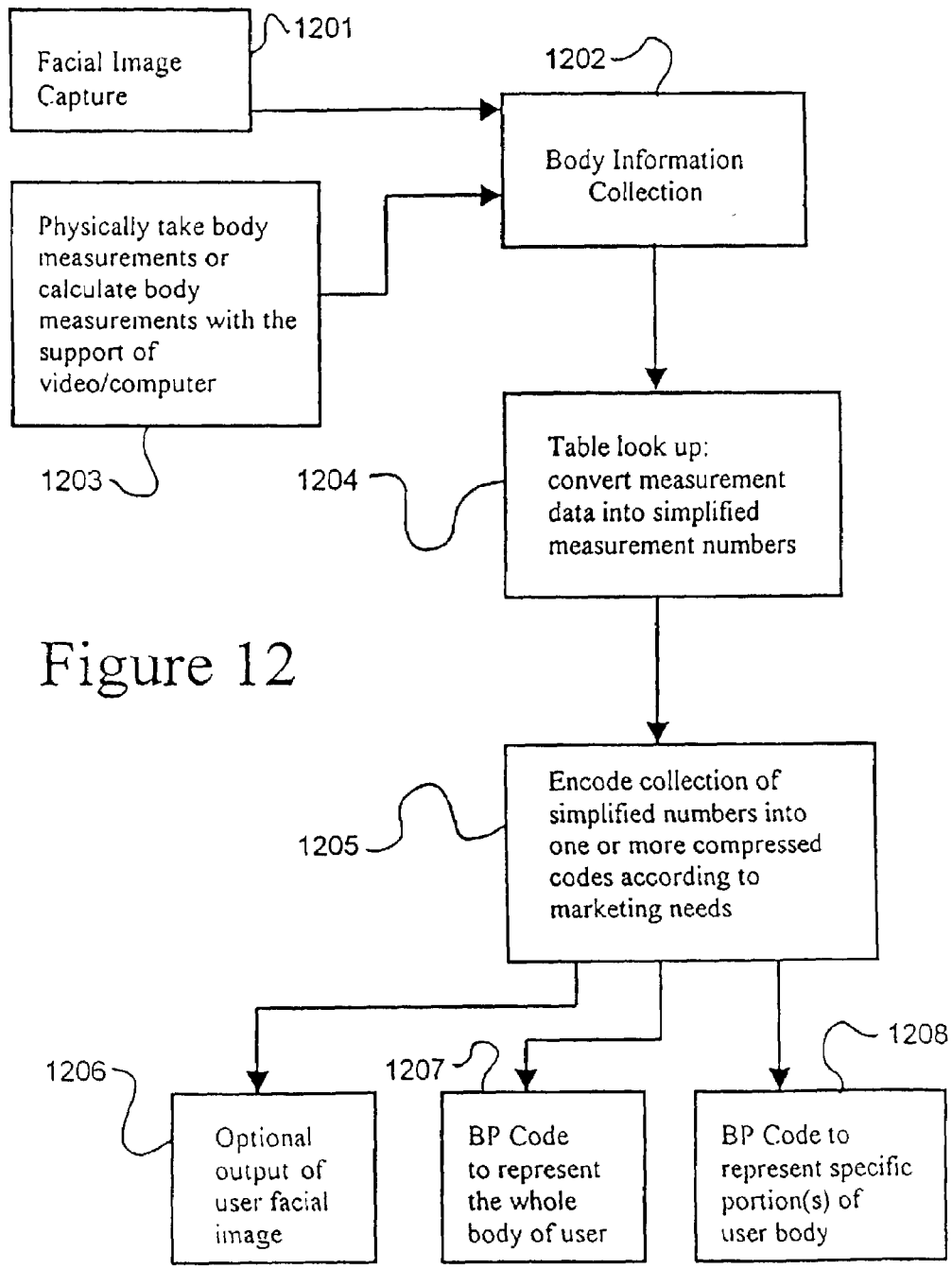
FIG. 12 illustrates the flow chart to produce a BP code.

FIG. 12 illustrates a more detailed picture of the BP encoding system of a human body. The body measurements of the human body is obtained manually by a tape measure, or by the video/computer supported high speed body measurement system previously discussed. As an option, the facial image of the user is also captured by a camera and provided in the format of digital data. The physical body measurements then go through a table look up as represented by the block 1204, either manually or through a computer program. Each measured parameter is assigned a simple quantized number by the table. For example, a neck dimension of 15 inch is represented by a quantized number 5 and a neck size of 15.5 inches is assigned a quantized number 6. All the simplified numbers of different parameters are then compressed to form a very simple single code represented by 1207, that can be easily handled or carried around. Alternately, different BP codes can be generated according to different portions of the human body. For example, a first BP code can be encoded to represent the upper torso of the user and a second BP code to represent the lower torso. The upper code is useful for shopping shirts and jackets, but not for pants. A data file 1206 representing the facial image of the user is useful to demonstrate virtual pictorial fitting presentation to the user during garment shopping.

Figure 13:
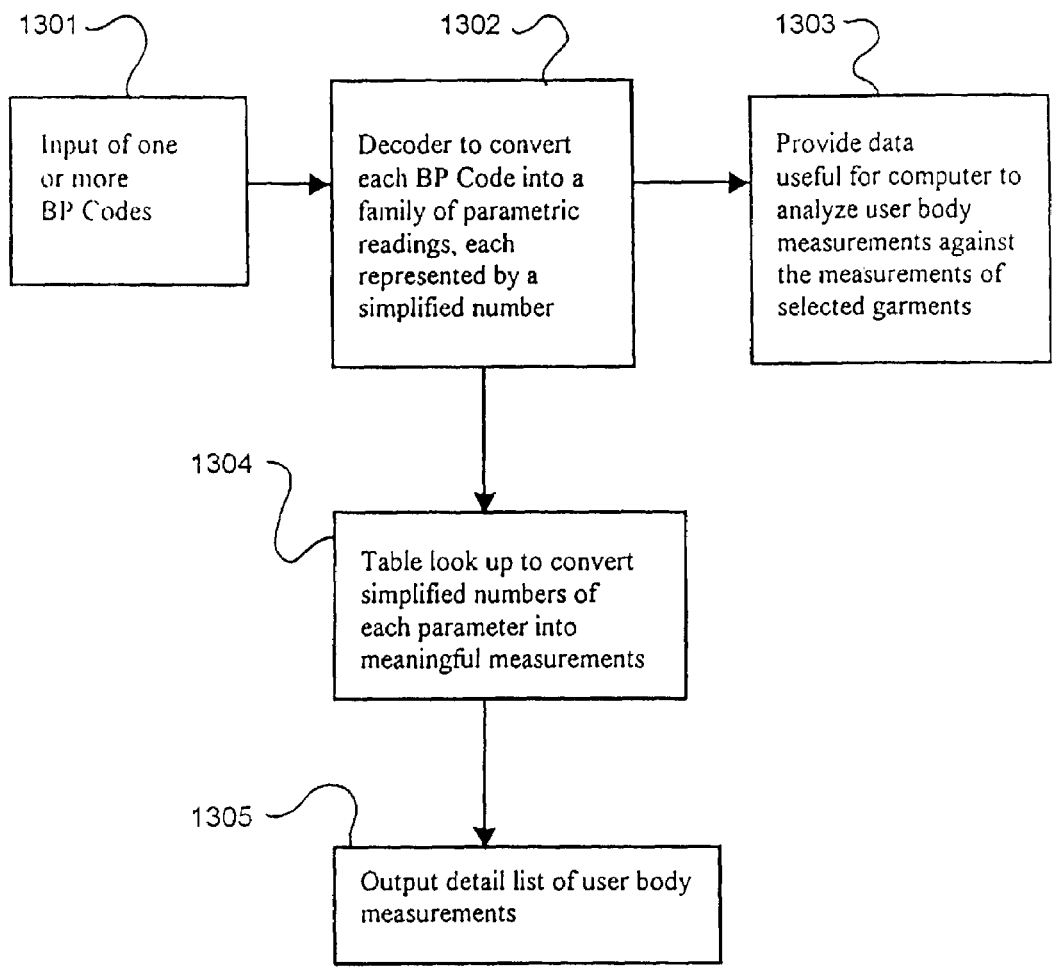
FIG. 13 shows a flow chart to decode a BP code to provide a detailed list of body measurements.

FIG. 13 illustrates how the BP code is handled during the shopping process. The store is not required to take body measurements of the user. The BP code of the user is simply fetched from an ID card, or from a computer database. The code then goes through a decoding process to obtain the simplified numbers, each representing the measurement of a human body parameter. These data, though perhaps not meaningful for human interpretation, are often useful for computer analysis; such as comparing the fitting with the dimensional information of a garment. If human visual reading is required, the code is further translated by a reverse look up table process as shown in 1304 for recovering the full body measurement list.

Figure 14:
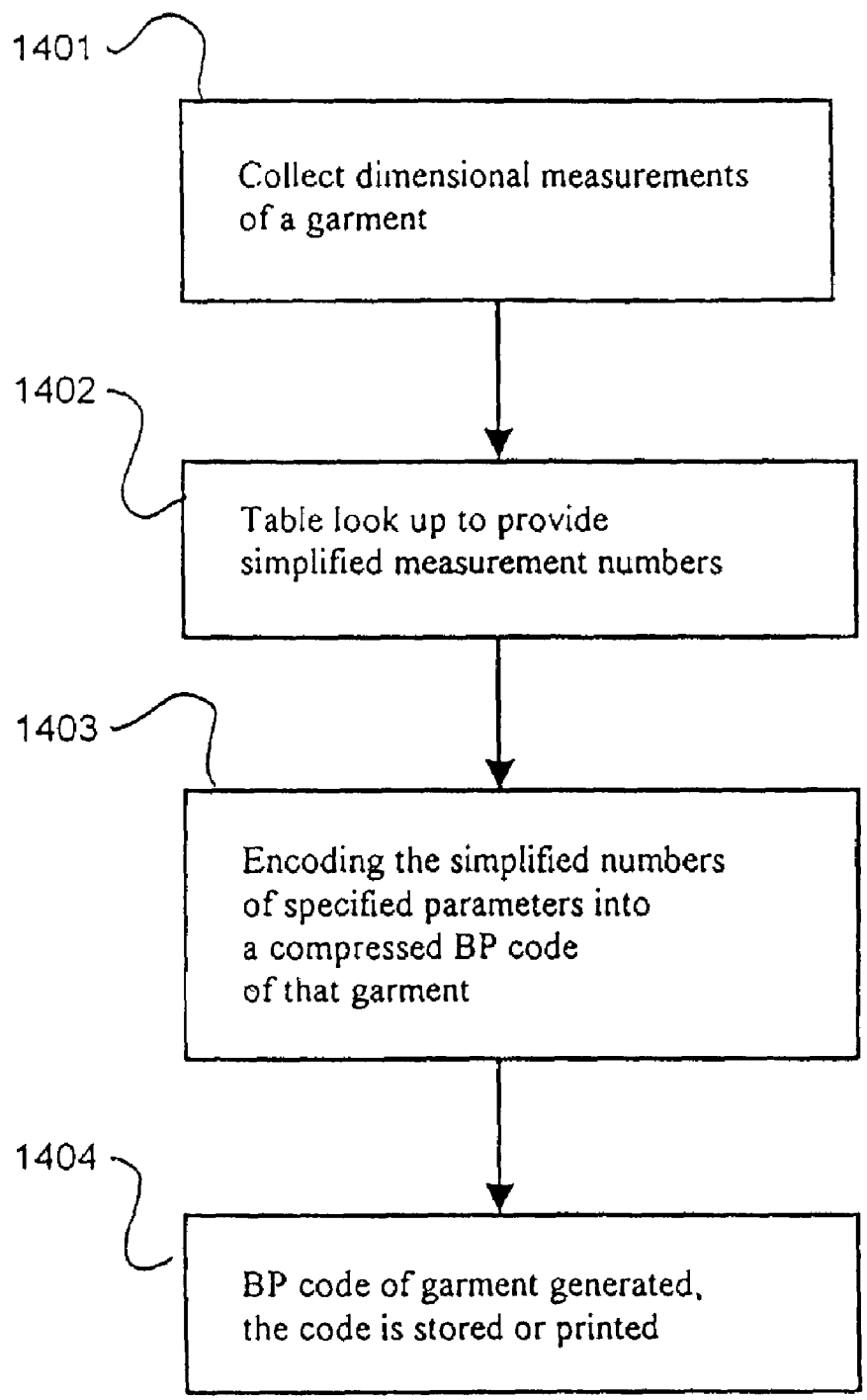
FIG. 14 illustrates the flow chart to produce a BP code for a garment.

FIG. 14 illustrates the process to produce the BP code for a garment. An image file of the garment is preferably associated with the garment BP code to enable the system to produce a virtual garment fitting presentation when the particular garment is selected by a user. This image file can be stored in the central computer or server of the retail store. For cost reasons, a very simple BP system is desirable for mass merchandise garment articles. The BP code of each garment is preferably printed on the hang tag attached to a garment. The user or servicing staff of the store may then make use of this garment BP code to help determine if the garment fits with the body profile of the customer.

Figure 15:
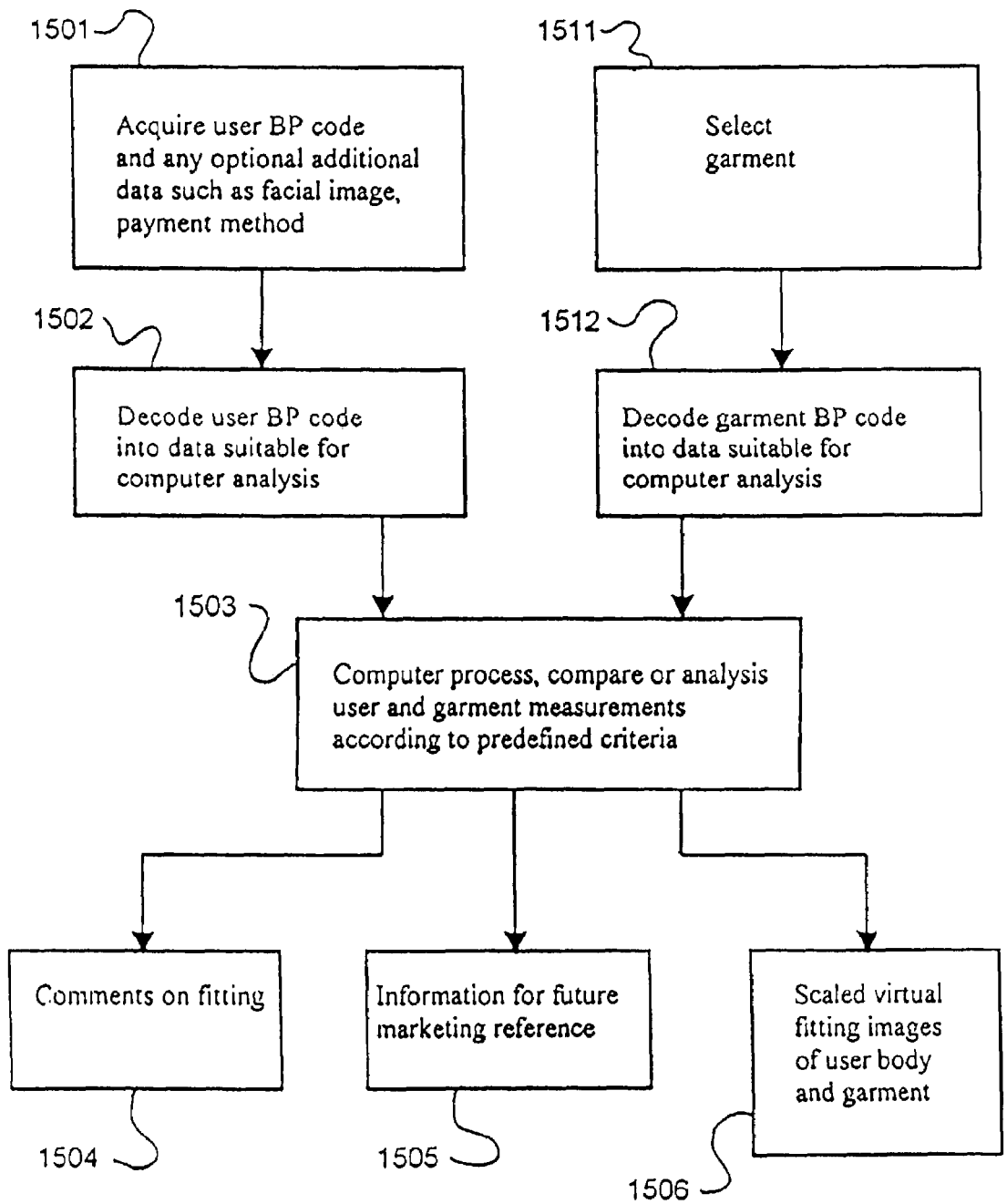
FIG. 15 illustrates an application example how the BP code of a user and that of a garment are handled by a computer to assist garment purchasing decisions.

FIG. 15 illustrates the shopping process supported by the BP codes of users and the garments. The BP codes acquired are fed into blocks 1502 and 1512 for decoding into further detailed numbers suitable for computer analysis or presentation. The output of the computer may be comments showing which part of the garment may have a fitting problem according to the BP code of the user received. A file of statistical data may also be created to support future market research. The system may provide valuable data to support marketing; such as the distribution of the body sizes; customer buying habits and the clothing preferences of customers with different sizes. For example, the system may provide a report concluding that taller girls prefer looser clothing. If the media carrying the user BP code is supported with user facial image data, a virtual fashion show can be provided to give users better ideas of how the garment will fit their bodies.

Figure 16:
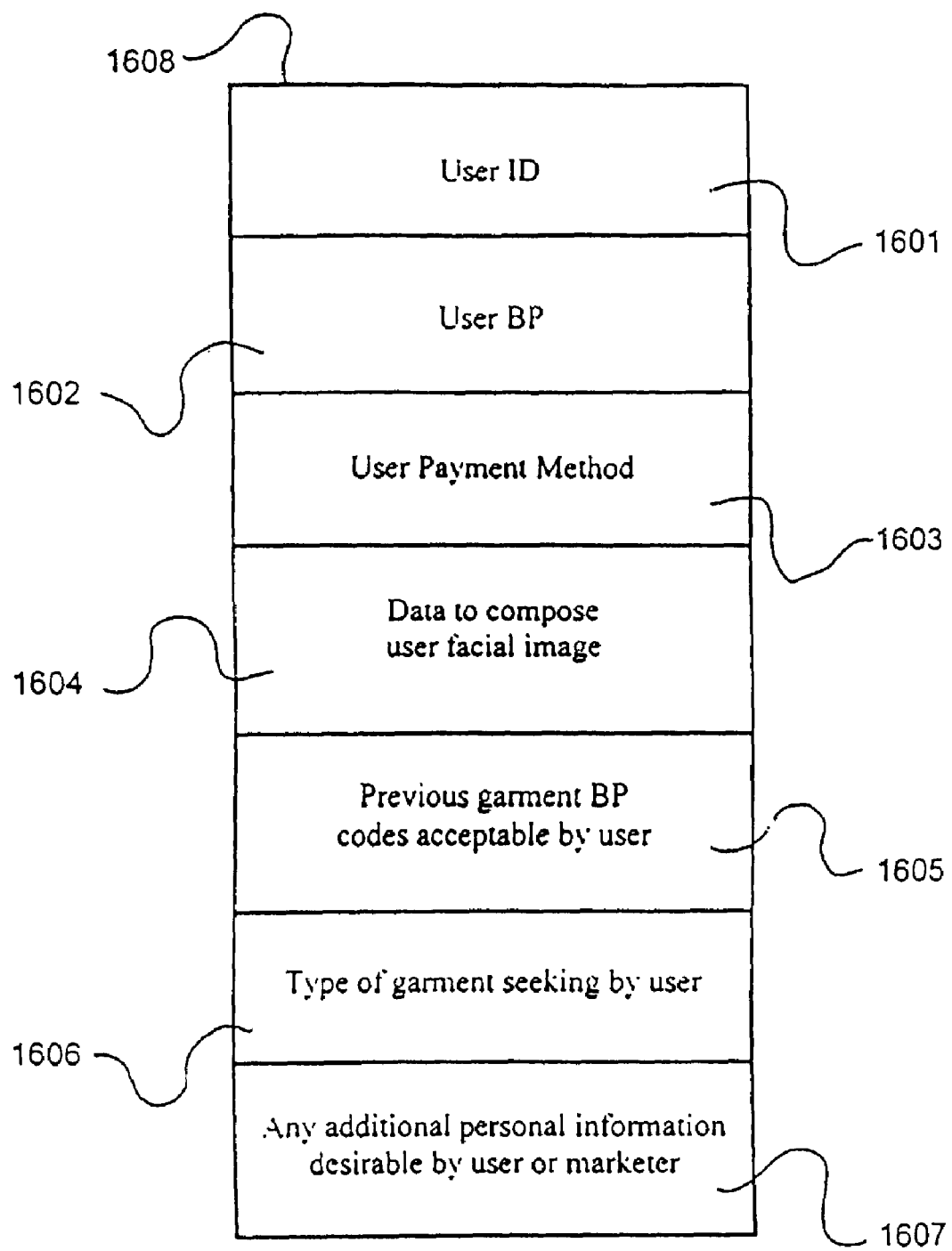
FIG. 16 illustrates an embodiment of a portable storage media which can be carried by a user for shopping assistance.

FIG. 16 shows an embodiment of a portable storage media which can be carried by a user for shopping assistance. The media 1608 can be simply a card printed with the user's BP code 1602, or using a bar code to represent the BP code. Alternately, a full featured portable media can comprise a magnetic strip, optical or solid state rewritable memory. With higher storage capacity, more personal information of the user such as the facial image 1604, credit card or direct account information 1603, acceptable garment BP code criteria 1605 or any other additional information desired by the user or the marketer to facilitate the shopping process. It is also possible for the user to make use of this portable media to combine the internet and store shopping modes. The user may access the web site of the store and preselect certain garments. The information about these preselections is then entered into the portable media (e.g. a floppy diskette) by the home computer of the user. When the user present this portable media at a store, it can be read by the store computer to efficiently direct the sales person to service the user according to the wish list recorded in the portable media.

A high capacity portable media can store more user information allowing for better quality and higher efficiency services to improve the shopping experience of the user. Alternatively, multiple user information, each similar to the content of the portable media 1608 can be stored on a single portable media, so that a mother can do the shopping for every member of the family with the support of a single media.

In an ideal Body Profile encoding system, a five to eight digit system should be able to represent all the measurements of a human body. Accordingly, every user having the same profile parameters will be allocated the same BP (Body Profile) code. For example, assuming a body profile system is defined to measure seven variables: neck circumference, shoulder width, arm length, chest circumference; waist circumference; hips size and inseam; and each parameter is quantized into nine different incremental measurements to service different body size users, the total possible combinations of these variables is $9^7$ (i.e. 4,782,969), which can be represented by a five digit alphanumeric number. The alphanumeric set can consist of 34 characters, i.e., numbers 0 to 9, and symbols A to Z, excluding letter O and letter I which are easy to be confused with the numbers 0 and 1. A four digit alphanumeric number will represent 1,336,336 combinations. A five digit number will give 45,435,424 combinations and a six digit code will provide 1,544,804,416 combinations. For example, a BP code "6RX3T" may represent the parameters of neck=3; shoulder width=4; arm length=4; chest=3; waist=3; hips=3 and inseam=5. The simplified number scale of each parameter is further referred to a look up table to obtain a specific measurement reading. For example, a number 4 neck circumference size is referred to 13 inches to 13.5 inches from the table and a waist number of 4 is referred to 24 inches to 25 inches. Alternatively, the coding system may be subdivided into "child size", "ladies", "gentlemen" and "big and tall". In this way the number scale in each class may refer to a different dimensional table, depends on the class used. It is believed that for child size, most numbers will be of small values; for big and tall people most numbers will be at the high end. As a result, a four to five digits BP (body profile) coding system may be adequate to service the system because many special combinations such as a extremely narrow waist and very big hips will be unreasonable. The number of possible parameters combined will be substantially less than the mathematical combinations of all variables by eliminating all the unreasonable combination of parameters. All the reasonable combinations left over is then encoded and/or decoded by a computer program according to a carefully designed algorithm to minimize coding and decoding computing time. This system is preferable because the body profile parameters can be organized by a standard computer program which can be encoded and/or decoded at any personal computer. Since everyone is sharing a standardized encoding and decoding system, the need for a central body profile storage computer is thus eliminated.

Another embodiment of encoding and decoding the BP number can be organized as follow:

Assuming the body profiles of men are described by the following parameters:

A. Arm length: 24 inches to 32 inches in 16 quantization levels, i.e., increments; e.g., 24 inches translates to an increment, i.e., reading of 0, 25 inches has a reading of 1, 26 inches has a reading of 2 and so on.

B. Neck diameter: 13 inches to 19 inches in 12 increments.

C. Torso length: 24 inches to 32 inches in 8 increments.

D. Waist diameter: 27 inches to 40 inches in 13 increments.

E. Leg length: 28 inches to 42 inches in 14 increments.

Assume a body profile for an exemplary user to be represented by the following data:
a. Arm length: 26 inches (reading 2).
b. Neck diameter: 15 inches (reading 2).
c. Torso length: 25 inches (reading 1).
d. Waist diameter: 30 inches (reading 3).
e. Leg length: 28 inches (reading 0).

For the convenience of presentation, the BP code generated for the above profile data will be represented by a ten based number as follows:

$$(((((((2\times16)+0)\times14)+3)\times13)+2)\times12)+1=70381$$

The term (2×16) represents the arm length which has 16 increments and a reading of 2. The next addition (0) and multiplication 14 refers to the next parameter having the next highest range of increments, i.e., leg length. The leg length of the user has a reading of "0" and 14 possible increments can be used to describe the leg length. The next parameter handled is the waist diameter, which has 13 possible increments and a reading of 3. The next parameter handled is the neck diameter which has 12 possible increments and a reading of 2. The last parameter handled is torso length which has 8 possible increments and a reading of 1.

The BP code 70381 will uniquely describe the body profile of a man to have an arm length of 26 inches; neck diameter 15 inches; torso length 25 inches; waist diameter 30 inches and leg length 28 inches. To decode the number 70381 to retrieve the individual readings, the following reversing operation can be performed:
(1) Dividing 70381 by 12, a quotient of 5865 and remainder of 1 is obtained. The remainder 1 refers to the code reading of the torso length and represents an actual torso length of 25 inches.
(2) Dividing the number 5865 by 13 to obtain a quotient 451 and a remainder 2. The remainder 2 refers to the code reading of the neck diameter and represents a neck diameter of 15 inches.
(3) Dividing the number 451 by 14 and obtain a quotient of 32 and a remainder of 3. Accordingly the number 3 refers to a waist diameter of 30 inches.
(4) Dividing the number 32 by 16 and obtain a quotient of 2 and remainder 0. The remainder "0" represents the leg length of 28 inches and the last quotient 2 represents the arm length of 26 inches.

It should be noted in the above encoding process that the parameters are handled in sequence from the parameter having the highest number of increments to the parameter having the fewest number of increments.

The foregoing exemplary encoding process produces a BP code comprised of a digits within a base 10 system (i.e., 0–9). In an alternative and preferred embodiment, a base 34 system (alphanumeric) is used in which the BP code digits can be represented by any of the integers 0–9 and letters A-Z (excluding the letters "I" and "O" to avoid confusion with the integers "1" and "0").

Alternatively, the BP code may be comprised of more than one compressed code to represent the body measurements of a user. For example, a BP code may be comprised of four different sub-BP codes expressed in series. Each sub-BP code respectively represents the upper torso measurements, the lower torso measurements, the measurements of the head, and the measurements of the feet. The sub-BP codes are therefore suitable for the user to fit shirts/jackets; pants/skirts; hats and shoes respectively. Other than enriching the BP code by the type of garment to be fitted, additional non-size related codes can be added to the BP coding system to identify other personalized parameters of the user, such as color preference, material preference, purchasing habit and even information related to the frequently used credit card.

Accordingly, the virtual garment coordination process by means of BP coding comprises the procedure to decode the BP code of the user. The decoded body measurement is then compared with size data related to a target garment. The size data of the target garment may also be decoded from another BP code representing the parameter measurements of the target garment. The output portion of the virtual garment coordination process equipped with the BP coding system may be visually supported by a display screen capable of presenting a picture of the user's body compared with pictures of the target garments. Different sizes and styles of the target garments can be provided to provide the virtual coordination and fitting effects. Visual messages providing recommendations may also be provided on the screen or by a printer. Alternatively, these messages can be provided by voice producing devices.

A facial image can be included in a hybrid system which utilizes the BP code described above in conjunction with a personalized coding portion for the computer to retrieve the personalized facial image or any other related personal data. This hybrid system enables the user to shop at both the stores offering the body profile system only and also stores offering the hybrid system with facial images.

Presently in the stores, most garment are classified by a simplified standard size system described by XS, S, M, L, XL, and XXL sizes. It should be noted that although many garments are supplied with simplified standard sizes, from time to time they are not of identical dimensions in all key parametric measurements due to variations in garment design, style and variation in fabric materials. The deviation is more serious when the garments are supplied by different manufacturers which may have a different way to interpret the standards of the simplified size system. It is a common problem that people buying a particular standard size garment often find minor incompatible dimensions and the garment purchased needs to be returned or modified. Therefore it is desirable for every garment to have its detailed dimensions specified and uniformly encoded with a simple BP code as described herein. With the BP coding method, the detail dimensions of the simplified standard size garments can be retrieved from any computer. This enables a garment to be faithfully represented when displayed in systems in accordance with the present invention. Since the body profile of a user faithfully reconstructs the dimensional structure of the virtual body to be displayed in the virtual coordination system, the simplified size garment displayed may not match perfectly with the body image constructed of the user. The virtual coordination system is therefore very useful for the user to try garments of different simplified standard sizes and to evaluate which standard size of the garment provides the best fitting to the user according to the body profile submitted. Alternatively, a program with specific criteria and algorithm can be used to determine if minor discrepancies between a standard size garment and the body profile of a user is tolerable. For example, an algorithm may be defined such that the neck circumference of a shirt should never be smaller than that of a user, and the waist dimension of a shirt should be one to two inches wider than that of a user. An actual BP coding system for garments preferably takes into account different garment types such as shirt, T shirt and trousers. This is because different types of garments may have a different size screening criteria. The different garment types may result in generating another coding parameter just for identifying the garment type.

Alternately, other non-size related parameter can be added into the garment BP code to identify other characteristics of the garment, such as color and material variations.

With the support of the BP code screening system, customers are happy, as all purchases going through the BP code screening system are predictable. The retail stores and garment suppliers are happier, because fewer returns are to be anticipated.

In a first application scenario, a user visits a store and enters his BP code or swipes his card through a reading machine. The store computing system retrieves the body profile of the user and recommends some suitable garment to the user. Alternatively, the user may key in the preference characteristics of the target garment such as type of garment, color and price range; then the servicing computer makes use of the body profile data of the user to scan through the inventory of the store to see if a garment matching all these requirements is available. The images of all suitable garments are then displayed on a displaying screen for viewing by the user one by one. If the facial image of the user is available in the system, the displaying screen can be configured to display a real life fashion show, showing the looking of the user properly coordinated with different kind of available garments. Eventually when the user selecs a particular design of the garment, the screen can tell the user where the selected garment can be located for pick up.

In a second application scenario, a user visits another store. The user swipes his card through a reading machine. The store computing system retrieves the body profile of the user and recommends some special garment design suitable for the specific body style of the user. For example, the pattern of the garment may be on long vertical stripes if the body size of the user is wide. Garments of horizontal stripes are recommended for thin and tall bodies. A virtual fashion show showing the picture of the using dressing in each of the recommended garments is displayed one by one on a displaying screen. Alternatively, the user may conduct a window shopping and browse through different garment designs offered by the store. When a desirable garment is located, the system will adjust the visual image of the garment according to the body profile retrieved and combine it with the facial image of the user. A virtual personalized picture of the user putting on the selected garment is then displayed for virtual coordination purpose. After the user determines which garment to buy, the computer system checks if inventory suitable for the body profile of the user is available. If stock is not available, the computer system generates a purchase order, which goes along with the body profile parameters to the factory servicing the store. The garment ordered by the user is then manufactured. An alternative application of this scenario is for the store to keep fabric samples and offer custom tailor clothing to every customer using the system. If the servicing system is connected to the manufacturing system of a computer supported manufacturing factory, the body profile data of the user can be fed to the fabric cutting machine located at the factory. The raw fabric material is then planned and cut into different fabric components according to the body profile dimensions of the user and also the design pattern of the garment design selected. When multiple orders of similar design pattern are received such as in large scale production of school uniforms, the body profile of the users will enable the computer aided manufacturing machine of the factory to optimize the fabric pattern arrangement on the fixed dimension raw fabric materials, such that minimal fabric materials will be used to fulfill the order.

In a third application scenario the user logs in at a garment retailing web site through her/his home computer. The user keys in the personalized body profile ID, and then the keywords describing the target garments looking for, such as color, type, price etc. The web site returns with garment images meeting all these requirements. The stock checking procedure or custom tailor procedure described above if the sale is to be concluded. For internet applications, the resolution of the image to be transmitted through the communication link is preferable to be of a lower resolution in order to reduce the response time required to fetch the downloaded images. Typically a resolution of 5 kB to 20 kB is adequate for such applications. In contrast, if all the facial image and the garment images are retrieved from a local system, the resolution of the images can be increased to provide higher quality garment coordination pictures. It is submitted that the system is not only suitable for customers to shop for suitable garments in a store, it is very important to support internet garment retail business as it enables the customers to purchase perfect fitting garment without actual seeing the product.

Since the facial image of the users, the body profile parameter data, the garment image files and related personal data are all stored in memory storage areas, the location of the memory storage areas is critical when the data stored are to be transferred from one location to another. Although these data may be stored in the same memory area of a system or remote from each other, they are preferably to be located to minimize data transferring, so as to improve response time. For example, in internet applications, the facial image data is recommended to be stored at the local computer and the garment image information can be stored at a remote centralized computer.

It should be noted that the automated camera supported, body profile generating system disclosed is an efficient way to collect the body profile for a big number of customers at a time. Manual assisted measurement is recommended to correct some particular measured parameters which tend to have a higher error rate. Alternatively, users are recommended to measure their own body profile parameters, record the measurements on a check list; and then enter the data into a terminal to establish their body profile file in the system and to obtain the ID code. In this way the data stored in the system will be of high accuracy. Another advantage of the independent BP coding system is that the data are independent and not stored in the database inside any centralized system. The user is therefore free to modify the parameters whenever required, without having to update the data file recorded in a central system. The BP coding system invented provided a simple and effective mechanism for user to update the data from time to time. This mechanism is required because the body shapes of a human being seldom remain unchanged for an extended period of time.

When the body profile parameter includes the head size, the system is useful to provide shopping support of hats and caps. When the body profile parameter includes the feet size, the system is useful to provide shopping support of shoes. It is foreseeable that once the system is accepted by the consumers and retailers, more information about the users, such as user preference and shopping pattern, may be included or attached to the BP coding file.

It should be noted that the shape and size of the garment generated for coordination purpose is preferably to be scaleable. That is the body shape and size be adjusted according to the BP decoded data of the user, in order to generate a life like coordination effect. In the situation a BP code is not entered into the system, the default or nominal garment size will be displayed.

The BP coding system is useful for many other applications, such as for a fashion designer to custom design an apparel for a user. The fashion designer may start from a body image reconstructed from the data derived from the BP coding data file of the user. This image is preferably to be of three dimensional nature and including the 3D facial images of the user. By using suitable 3D rendering technique, the fashion designer can interactively trying different design portions of the fashion with the 3D life like body model generated. A typical design process includes pasting different designs of fabric, pattern, color and shapes of fabric onto the body model. The principle of computer supported 3D rendering is well known in the art and therefore not to be further elaborated in this application.

Another alternative application of the body profile system is for the data and/or encoded BP number to be collected over different period of time, the different data collected versus time is then compared with some pre-established data base to analyze if the change of body profile indicates any abnormality or a caution of health signal is to be highlighted. For example, the body profile of a baby measured at different time period can be collected to compare with pre-established data of baby growth curve to determine if the baby is growing normally. Alternatively, the parent may make use of the body profile data collected from the baby to predict what size of clothing is to be purchased six months later. The encoded BP code conveniently enables the parent to look forward or predict the size of the baby at a later time. Similarly, a pregnant mother may make use of the early BP code to prepare maternity clothing to be used at a later time. Alternatively, doctors may analyze the changing BP codes to predict the likely birth dates of a pregnant woman. In order to accurate predicting the change of body profile, some special parameters such as the body weight can be added to the BP parameter list. With the support of reference data base, the BP system can be conveniently used to monitor normality of change in body profile or predicting the body size in the future time.

Since users can use the BP codes and facial images to facilitate garment shopping at different stores, it is convenient and economic to structure a servicing system for enabling multiple garment stores and/or web sites to share the same data base. In one embodiment of the system, the sharing data such as the image data is stored at a centralized servicing system and the data is to be shared by all the participating stores and web sites. Alternatively the sharing data may be stored at the server of any participating store or web site and the directory information is then shared with all other stores and web sites so that the data can be shared when a request of service is received. Preferably a master servicing system is also established to handle the updating of the sharing data.

It should be noted that the computing apparatus, computing device, computing system referred in this application may comprise a terminal, a processor, a single computer, or a network of computers which are combined to service a specific function.

Figure 7:
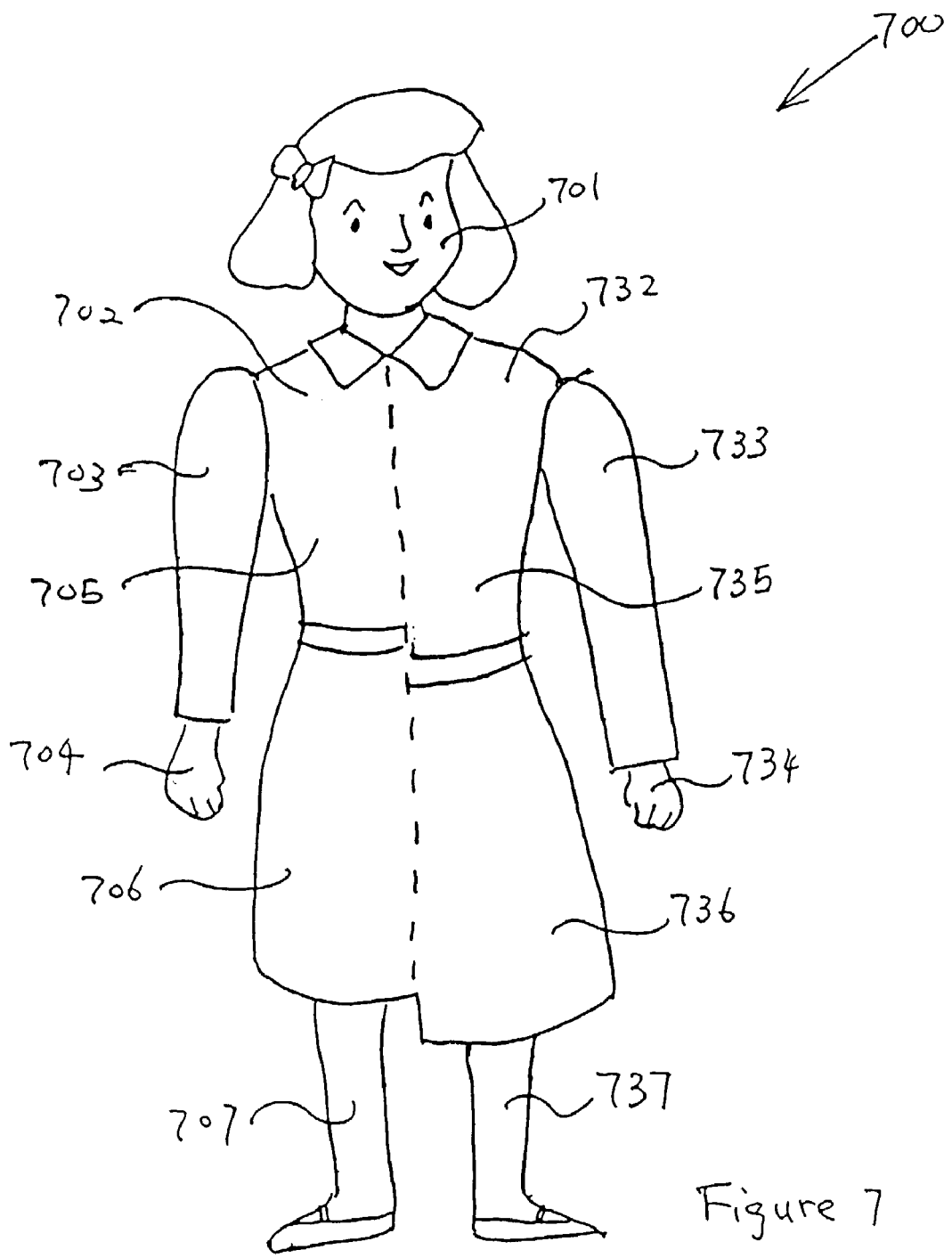
FIG. 7 illustrates the combination of the facial image of a user with the garment image of different BP coded sizes.

FIG. 7 illustrates how a personalized garment coordination effect is displayed on a displaying screen. The facial image 701 is a real life facial image of the user. The body image beneath the facial image is a body model faithfully structured according to the body profile data of the user. The facial and body images are constructed to be in proportion to real life dimensions. The left half of the clothing image represents and M (medium) size slightly shorter than the requirement. The right half of the clothing image represents and L (large) size garment slightly larger than the appropriate dimension. In the garment coordination process, different garments of appropriate sizes are displayed for the user to select the style she like best, without actually putting the garment on. The purpose of FIG. 7 is to demonstrate how different simplified standard size garments can be virtually tried on the displaying screen. Suppose the body size of the user is between M and L sizes. The left hand side image represents the coordinated view when a M size clothing is put on the virtual body of the user. The right hand side image represents the view of a L size garment. It can be observed that a L size garment, although slightly oversized fits better than the M size garment. When the BP coded sizes of the user and the BP code representing the garments are available, the user can accurately try different standard sizes of the garment without actually putting them on the user's body. The system is particularly important for internet based garment retail because the users do not have an opportunity to try the garment before it is ordered and mailed.

Figure 8:
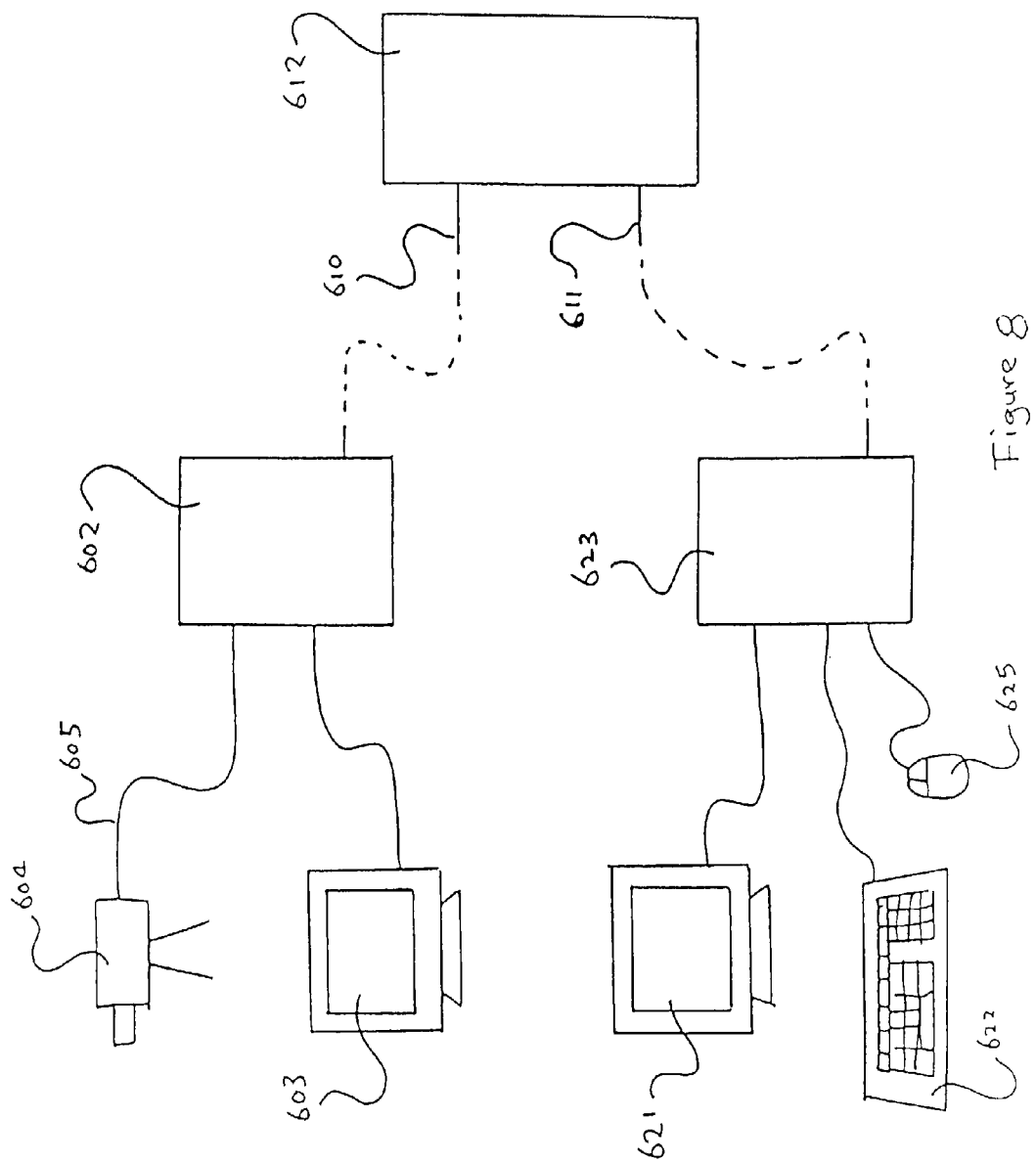
FIG. 8 shows a remote computer linked with a image capturing kiosk located at a point of sale or a home computer connected through communication channels.

FIG. 8 illustrates a setup of internet garment shopping making use of the system invented. In accordance with the existing invention, firstly the user is required to provide measurements of his/her body profile into the computer. The computer will generate a BP code representing his/her body profile. This BP code is also useful when the user conducts virtual garment shopping in a brick and mortar garment retail store supporting the BP coding system. If the facial image of the user had not been previously stored in the system, the user may make use of his/her digital camera 604 at home to take a snap shot of his/her facial image. This facial image, usually in JPEG or Bitmap format, is required to be touch up to eliminate the background pictures, because most people do not have a non-interfering background and automatic imaging processing software at home. Alternatively a home computer in conjunction with a digital camera or a scanner may also be configured to perform the facial image capture function. A code comprising one or more code words representing the user is assigned to identify the electronics image file captured. The similar set up of 604, 605 and 602 can be used to generate electronics image files of an assortment of garments and store the electronics garment image data at the local computer or the remote computer 612. A code comprising one or more code words is assigned to identify one garment from another. In a mode of operation, the remote computer 612 represents the host computer of the garment retailing web site and the communication link 610 represents the internet connection. Image files of the garment are normally stored at the host computer 612. The facial image file can be stored at the home computer 602 or the host computer 612. If the facial image file is stored at the home computer 602, the life like garment coordination is only possible to be performed at the specific home computer 602 where the facial image of the user is stored. If the facial image file is stored at the host computer 612, the user can obtain the life like garment coordination service through any remote computer terminals accessible to the host computer 623.

Computer 623 is also configured to connect with the remote computer 612 through a communication channel or communication link 611. In the latter case, monitor 621 displays the matching picture of the selected facial image combined with the selected garment image. Codes representing the selected facial image and garment are entered into the computer 623 by input devices such as the keyboard 622 or the mouse 626. Usually the user may select a variety of garment images to try with the personalized facial image in order to determine which garment design offers best fitting with the personal characteristics of the user. Alternatively, users may coordinate and harmonize garment with the facial image of a friend or relative in order to select a garment gift for the particular friend and relative, without the real person to present on spot to support the selection and coordination process.

In one mode of operation, the camera and computer is set up at a point of sale and the customer takes a facial image at this spot. The customer may use the monitor 603 connected with the same computer 602, or the monitor 621, connected to the computer 623 to coordinate this facial image with different garment image stored in any of the computers 602, 612 and 623.

In another mode of operation disclosed in the parent application, the monitor 621 represents the facial displaying monitor 501 of FIG. 1. In this case, the regional computer 507 is identical to the computer 623. When the customer feels interest about the garment 506, he/she just key in the code represents his/her facial image. The image will be shown on the monitor and the customer is ready to appraise how he/she will look with the garment 506 without actually putting the garment on.

It should be noted that the communication channels 610 and 611 can be any type of channels connecting two computers together, as defined in this specification, or any other way to connect between two computers not mentioned in the specification, no matter if the computers are connected by wired, optical or radio frequency communication links. It should be noted that the image capturing computer 602 and the image reading computer 623 may in fact be the same single computer to carry out the preferred function of the subject invention. In this situation the communication channels 610, 611 become the same single communication channel.

Figure 9:
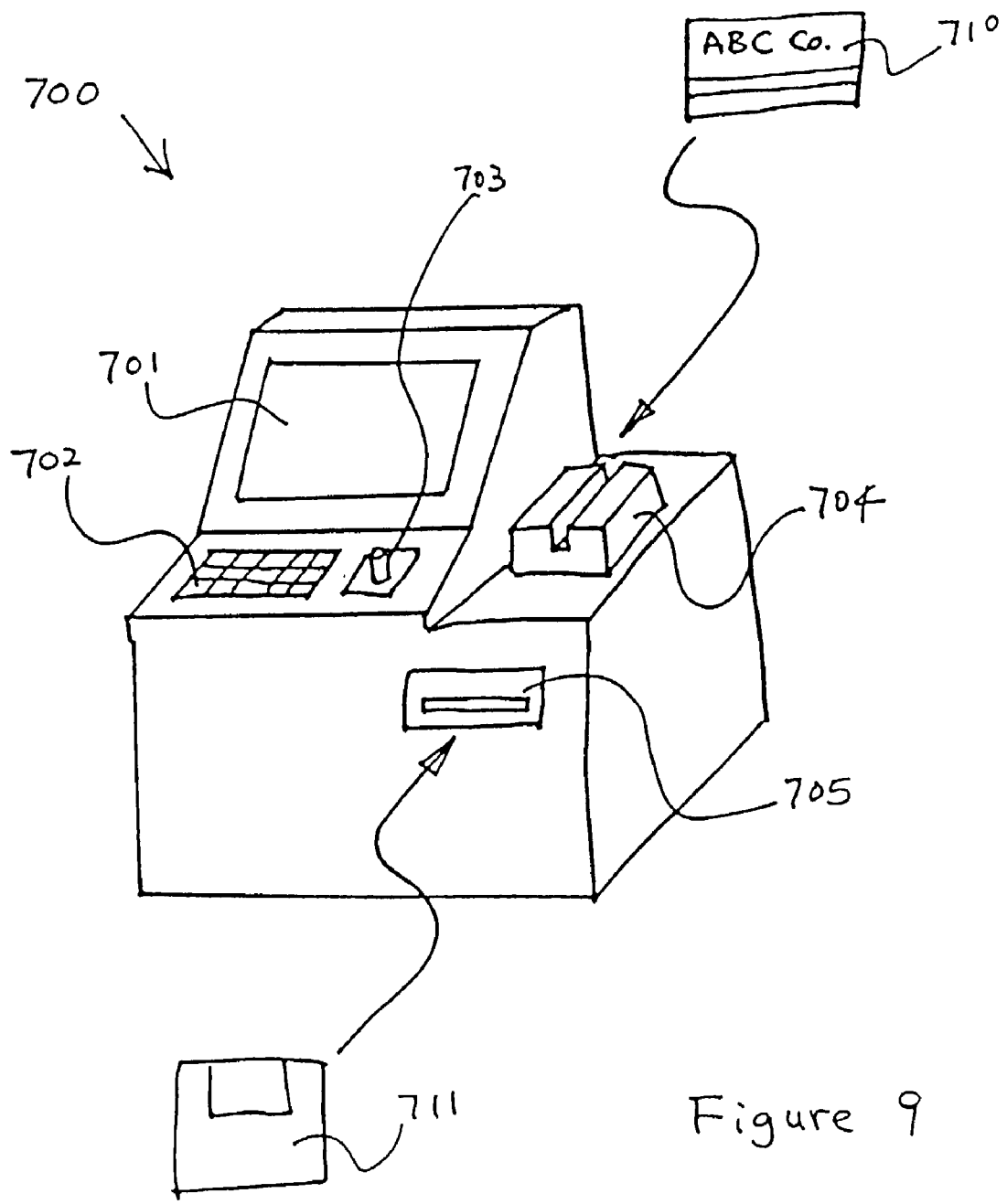
FIG. 9 illustrates an embodiment of a servicing terminal to be located at the store offering the invented services.

FIG. 9 discloses an embodiment of the servicing station to be set up at a point of sale in accordance to the disclosure of the invention. The terminal 700 comprises a screen 701 and control input devices are represented by a keyboard 702 and a joystick 703. Further data input device are represented by the card reader 704 and disk drive 705. It should be noted that the control and data input device illustrated are exemplary and other alternative input devices such as touch screen, touch pad, voice control devices or mouse can be used. A user may carry a tag, or card containing a BP code during the shopping time. In many applications, this card can be a combination of the BP coding card and also the credit card issued by the store or a third party such that the user can use one card to complete the shopping process. When the BP code is read by the card reader 704, a virtual body in proportion to the body dimensions decoded from the BP code is displayed on the screen. An arbitrary face image may be used to combine with that virtual body image to try the selected garment images selected by the user. If the card 710 contains a user reference code, which corresponds to a data file representing the face image of the user, the terminal will fetch the face image from the face data storage device. Usually this storage device is located at a central server, which services multiple terminals, like the one illustrated in FIG. 9. In case users do not want their facial images to be stored in a server or computer of a store for privacy or security reasons, they can prepare their facial image file on a portable diskette 711. Their facial images are retrieved every time when the diskette 711 is inserted into the disk drive mechanism 705. When a diskette of sufficient memory capacity is used, multiple facial images of different people, or for the same person with different hair styles can be stored on the same diskette 711. The multiple facial images feature on a single diskette is very important because a mother can go shopping for the whole family while the kids are at school and the husband is working in the office. Alternatively a husband can take the reference ID number, BP code or ID card 710 of his wife to shop a garment as her birthday gift, without the presence of the lady at the store. The memory size of the portable media depends on the amount of information required to be stored on the media. Simple bar code or magnetic stripe is adequate to store one or more BP codes. When one or more facial image of the users are to be stored on the portable media, an optical or magnetic diskette is required.

Figure 10:
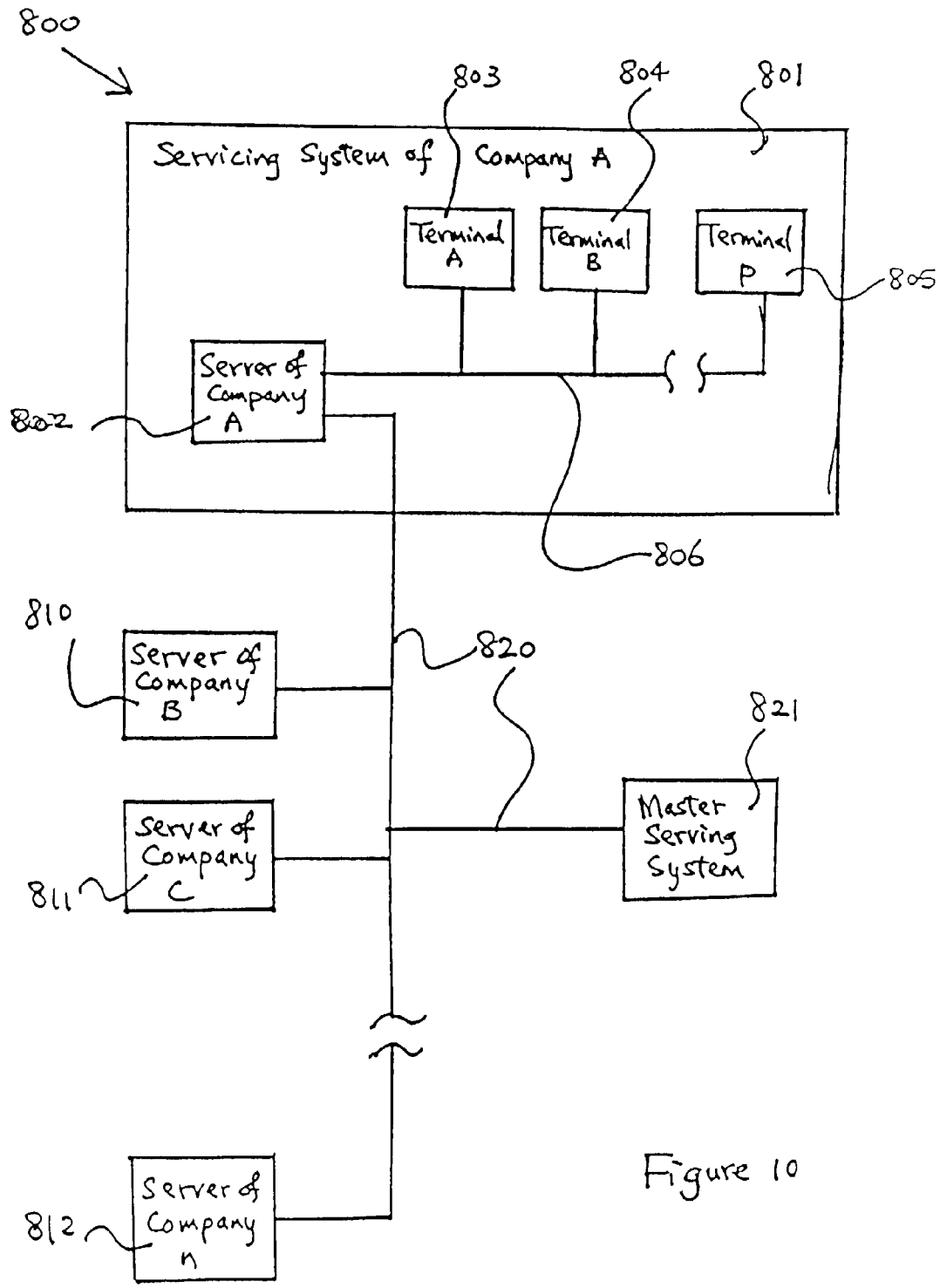
FIG. 10 illustrates an embodiment of the server system established at different companies to participate in the invented information sharing system.

It is a waste of the storage resources if the facial image of a user is to be stored separately in the local server system of every stores. Therefore it is highly desirable for the users to post their facial images at a central location to be shared by the server and terminals of different stores. FIG. 10 illustrates a system setup to serve this application embodiment. A user may create a personalized facial image and fed the data file representing this facial image through the terminal 803 of a selected store for storing at a centralized storage area located at a master servicing system 821. Whenever the user logs in at the terminal of another store C, the server 811 of the store request the facial image of the user from the master servicing system 821. When the facial image is fetched, it is sent to the terminal and the facial image is reconstructed for garment coordination service of the user. Every time when a user updates a facial image, this image is then posted at the centralized master servicing system 821. It should be noted that two different kinds of networking system is being used in this application example. The connection 820 represents a network external to the servicing company such as the internet or any other global network capable to provide the similar function. The second network 806 is typically internal to the company. This network connects all the servicing terminals 803 to 805 to the server 802 of the company. Each of the terminal can be represented by the embodiment 700 illustrated in FIG. 9.

FIG. 10 can be interpreted differently to provide another efficient embodiment for the system. When a sharing data such as facial image is firstly submitted to the system, it is stored at the storage area of the receiving server, say server C. Server C then communicates the code number of this sharing data to the master servicing system indicating that the sharing data is stored at it's system. When the user visits another company A and logs in the same user number at a terminal, the server of company A will look at the directory and contact server C to fetch the sharing data through the communication network 820. The benefits of this alternate system is that if the sharing data is located at a place the user accesses frequently, the contact terminal can fetch the sharing data through it's internal network system 806 which is quicker and cheaper than to collect the data through the internet and the internal system of the master servicing system. In case company A detects that the user is also a frequent customer, it may decide to simultaneously store the sharing data of the user in it's storage area. In this situation, the server of company A will report to the master servicing system that it is keeping another copy of the sharing data. This procedure is necessary because the user may update the sharing data from time to time. Whenever sharing data is updated, the master servicing system will fetch the updated data and distributes it to the servicing system of all the participating system claiming that the sharing data had been stored. Under many situations in this business model, it is desirable to set up a central data management company linking up with the retail stores, through internet or other communication channels. The data management company receives the notification when a user log in at a particular store and then direct the computer system of the store to fetch the related BP or facial information from another location storing the required information. Every time the storage location of the related BP or facial information is updated or changed, the directory record of this servicing company is updated. Alternatively, this servicing company may keep all BP or facial information for a group of customers, and provide the data update management and data storage to all selected retail stores. The servicing company may receive a very small charge from the store every time when information is requested. Alternately, a higher fee may be charged when a transaction supported by the service is recorded.

From the foregoing, it should now be appreciated that applicant has disclosed herein embodiments of a complete system suitable for users to perform virtual garment coordination, with a real life looking facial image to view and select garments. The described BP coding system is suitable for users and garment manufacturers to describe their garment related dimensional characteristics by one or more universal multiple digits code. The system enables relatives or friends to appraise and purchase gift clothing without the presence of the user. It is recognized that the system also enables simplified standard garments to be virtually tried before an order is placed, during an internet shopping. Alternatively discrepancy between a BP code data file and the closest standard size garment can be analyzed before the garment is tried. It is contemplated that two different garments, each combined with the facial image of the user, can be displayed side by side for comparison purpose. Alternatively, two garments of the same design but of different standard sizes can be displayed side by side, in part or in whole for the user to determine which standard size provides the most compromised fitting. The system is also applicable for a fashion designer to provide computer supported custom fashion design service to fit the special body profile of a customer. The BP data decoded is also suitable for linking with the computer aided manufacturing facility to automate and optimize the cutting of fabric patterns. Alternatively, the BP code collected at different times can be used for a computer to analyze if the changing of the body profile is normal according to a base of reference data previously established. Although detailed embodiments of the invention have been disclosed, it is recognized that variations and modifications, all within the spirit of the invention, will occur to those skilled in the art. It is accordingly intended that all such variations and modifications be encompassed by the appended claims.

I claim:

1. A method of producing a body profile (BP) code to describe the physical dimensions of a human and/or garment body, said method including:
    defining m different physical dimensional parameters of a body;
    measuring for each of said m defined parameters a physical dimension of said body to respectively produce m values; and
    processing said m values to produce said BP code comprising a compressed multidigit code representing said m values.

2. The method of claim 1 wherein said BP code is subdivided into a first compressed sub BP code and a second sub BP code; wherein said first compressed sub BP code is configured to be useful independently without said second sub BP code for size matching or garment shopping.

3. The method of claim 2 wherein each of said first and second BP code represents a different portion of said body.

4. The method of claim 1 wherein said BP code forming process includes multiplication and addition.

5. The method of claim 1 wherein said BP code is decoded by a process including division and calculating the remainder.

6. The method of claim 1 further including a step of recording said BP code on a record represented by a card or a storage media.

7. The method of claim 6 further comprising a step to store non-dimensional data related to said body onto said record.

8. The method of claim 6 wherein said record is portable.

9. The method of claim 8 wherein said record stores the BP codes of at least two persons.

10. The method of claim 1 wherein said measuring step utilizes at least one camera.

11. The method of claim 1 wherein said processing step generates a first BP code representing the body profile of a person;
    said method further including a step to compare the data derived from said first BP code with the dimensional measurements of a garment or with the data derived from a second code that represents the dimensional measurements of a garment.

12. The method of claim 11 further comprising a step of providing virtual images of said person and said garment.

13. The method of claim 11 further comprising a step of providing visual images of two garments for side by side coordinated comparison with a visual image of said person.

14. The method of claim 11 further comprising a step of providing fitting information related to the body profiles of said person and said garment.

15. The method of claim 11 wherein the comparison step is performed at a first computing apparatus, and the dimensional measurements of said garment is obtained from a second computing apparatus connected by a communication link to said first computing apparatus.

16. The method of claim 1 wherein said body is a garment; and
    said method includes the further step of translating said BP code into dimensional values suitable for tailoring fabric material.

17. The method of claim 16 including the further step of controlling a fabric cutting machine in accordance with said translated dimensional values.

18. The method of claim 1 wherein said BP code comprises 5 to 12 digits.

19. The method of claim 1 wherein a digit of said BP code is defined by one of k symbols, where k is a number equal or greater than ten.

20. The method of claim 1 including the further step of processing said BP code for building a properly scaled body model with a computing apparatus.

21. The method of claim 20 wherein said model includes three dimensional data.

22. The method of claim 20 including the further step of designing a garment based on said scaled body model built.

23. The method of claim 1 including the further step of encoding and/or decoding said BP code at different time intervals, and a step to process or compare the body measurement data collected during the different time intervals according to a predefined algorithm.

24. A body profile code processing system comprising:

a first computing apparatus having an input device and a visual output device; and a program executable by said first computing apparatus, said program being configured to (1) encode multiple body measurements by a first algorithm for producing a compressed multiple digit Body Profile code and/or (2) convert a compressed multiple digit Body Profile code by a second algorithm into a group of data each representing a measurement of a body.

25. The system of claim 24 wherein said Body Profile code is produced by a process including multiplication and addition.

26. The system of claim 24 wherein said Body Profile code is decoded by a process including division and calculating the remainder.

27. The system of claim 24 further comprising a file representing the facial image of said human body.

28. The system of claim 24 further comprising:
a first BP code representing the body profile of an identified person;
the measurements, or size, or BP code of one or more garment(s); and
a program to display a coordinated image of said identified person and any of said garments on said visual output device.

29. The system of claim 24 further comprising:
a first BP code representing the body profile of an identified person;
the measurements, or size, or BP code of one or more garment(s); and
said system is further configured to provide fitting information related to said person and said garment.

30. The system of claim 24 further comprising:
a first BP code representing the body profile of an identified person;
the measurements, or size, or BP code of one or more garment(s); and
said system is further configured to provide the visual images of two or more garments for side by side coordinated comparison with a visual image of said identified person.

31. The system of claim 24 further comprising a communication link connecting said first computer apparatus with a second computing apparatus, wherein said second computing apparatus stores information of multiple garments for processing in said first computing apparatus.

32. The system of claim 24 further comprising a card or a portable media storing a Body Profile code and
said input device is configured to read data from said card or portable media.

33. The system of claim 32 wherein said card or portable media stores information of at least a first user and a second user; said computing system is further configured to enable a user to have a choice on selecting information about said first or second user.

34. The system of claim 24 further comprising a fabric cutting machine responsive to data derived from said Body Profile code.

35. The system of claim 24 further comprising a program configured to analyze the Body Profile data related to said human body collected during different intervals of time.

36. A method to facilitate garment shopping comprising the steps of:
(1) measuring the body related dimensions of a person and providing n digits of data to represent said measured dimensions;
(2) providing a m digits code enabling a computer to retrieve said body related dimensions wherein n and m are integers and m is smaller than n;
(3) providing a record represented by a card or a portable media;
(4) storing said m digits code into said record.

37. The method of claim 36 further comprising a step to provide a compatible reading device to read said m bit code for retrieving the body related dimensions of said person.

38. The method of claim 36 further comprising a step to provide the data representing the facial image of said person and to store said facial image related data into said record wherein said method further comprising another step to read said data and to display the facial image of said person after said data is read.

39. The method of claim 36 wherein said portable media is configured to store the body measurement related data of two or more persons.

40. The method of claim 36 further comprising a step to store non-dimension related personalized data onto said record.

41. The method of claim 36 wherein said record stores visual or digital information.

42. A business method for use by clothing retailers for facilitating the selection of appropriately sized garments for a customer, said method comprising:
acquiring a compressed customer body profile (BP) code defining multiple values respectively describing different physical dimensions of a customer's body;
providing one or more garments of different dimensional measurements;
processing the values represented by said compressed customer BP code and the dimensional measurements of said garment(s) to provide fitting information related to said customer's body and said garment(s), said fitting information includes but not limited to dimensional, or size, or visual information; and
producing human readable output or a visual display to present said fitting information.

43. A business method for use by clothing retailers for facilitating the selection of appropriately sized garments for a customer, said method comprising:
acquiring a compressed customer body profile (BP) code defining multiple values respectively describing different physical dimensions of a customer's body;
providing two or more garments of different dimensional measurements;
processing the values of said compressed customer BP code and the dimensional measurements of said garments to recommend a fitted garment for said customer.

44. The method of claim 36 further comprising a step to provide the data representing the facial image of said person and to store said facial image related data into said record together with said m digits code.

* * * * *